3,221,027
COUMARIN PHOSPHATES
Roy Vivian Foster, Tring, and Gerald Sydney Poll, Harrow Weald, England, assignors to Cooper, Mc-Dougall & Robertson Limited, Berkhamsted, England, a British company
No Drawing. Filed Sept. 18, 1963, Ser. No. 309,857
Claims priority, application Great Britain, Aug. 24, 1961, 30,529/61
8 Claims. (Cl. 260—343.2)

This application is a continuation-in-part of application Serial No. 216,984, filed August 15, 1962, now abandoned.

The present invention relates to organo-phosphorus compounds, to a method of preparing them and to compositions containing them.

It has been found that organo-phosphorus compounds of Formula I have pesticidal properties in screening tests carried out against *Musca domestica* L. (the housefly), *Blattella germanica* L. (the cockroach), *Lucilia* spp. (blow flies), *Aedes aegypti* (the mosquito), *Boophilus* spp. (ticks), *Tetranychus telarius* (two-spotted spider mite), *Conotrechelus nenuphar* (plum curculio), *Epilachna varivestis* (Mexican bean beetle), *Macrosiphum pisi* (pea aphid), *Oncopeltus fasciatus* (larger milkweed bug), *Prodenia eridania* (southern armyworm), *Sitophilus granarius* (granary weevil), *Tribolium confusum* (confused flour beetle). The compounds are especially characterised by a persistence of activity against *Lucilia* spp. and by a high activity against *Boophilus* spp. In this specification the terms "pest" and "pesticidal" refer to members of the Insecta and Arachnida.

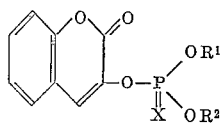

(I)

In Formula I and hereinafter in the specification:
$R^1$ and $R^2$ are each an alkyl group having from one to five carbon atoms; and
X is selected from the class consisting of oxygen and sulphur.

The preferred compounds of Formula I are those wherein $R^1$ and $R^2$ are the same or different and each is a methyl or ethyl group, and X is a sulphur atom. Particularly preferred compounds are O,O-dimethyl-O-coumarin-3-yl phosphorothioate and O,O-diethyl-O-coumarin-3-yl phosphorothioate.

The present invention in one aspect thereof provides an organo-phosphorus compound of Formula I.

A compound of Formula I may be prepared by the reaction of an O,O-$R^1$,$R^2$-phosphorus compound with 3-hydroxycoumarin or an alkali salt of 3-hydroxycoumarin.

For example, they may be prepared by the reaction of a phosphorus compound of Formula II

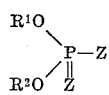

(II)

wherein Z is a halogen atom, preferably chlorine, with 3-hydroxycoumarin or an alkali salt of 3-hydroxycoumarin, in the presence of an acid binding agent, for example an alkaline carbonate such as potassium carbonate, of a solvent such as acetone, ethylmethylketone or benzene, of a catalyst such as finely powdered copper, and with heating.

As another example, the compounds of Formula I are prepared by the reaction of a phosphorus compound of Formula II, wherein Z is a hydrogen atom, with 3-hydroxycoumarin in the presence of an acid binding agent, for example triethylamine or pyridine, preferably at a temperature between 10° and 50° C.; the reaction is carried out in a solvent, which may act as an oxidising agent, such as carbon tetrachloride, or when a non-oxidising solvent such as benzene is used, an oxidising agent such as carbon tetrabromide is added.

According to the present invention in a further aspect, there is provided the above described method of preparing an organo-phosphorus compound of Formula I.

An organo-phosphorus compound of Formula I may be used with an acceptable carrier therefor in a composition for the control of pests. The components and the effective dose range of a composition will depend on a number of variable factors, for example the effectiveness and toxicity of the organophosphorus compound of Formula I and the composition, the pest to be controlled, the mode and frequency of use of the composition and the method of manufacture. Thus it may contain a diluent and a dispersing, wetting or surface active agent and may be presented as granules or a dust, or as a dispersable or wettable powder or spray or drench in water/oil emulsion or a miscible oil concentrate when a preserving, suspending, thickening or emulsifying agent or a sticker may be included; such compositions may be made by the admixture of the components. The organo-phosphorus compounds may also be presented in a thermoplastic or a thermosetting resin, or with a propellant in a pressure pack or aerosol prepared by cold or pressure technique.

According to the present invention in yet a further aspect, there is provided a composition for the control of pests containing an organo-phosphorus compound of Formula I and an acceptable carrier therefor, and the method of making the composition by the admixture of an organo-phosphorus compound of Formula I with acceptable carrier therefor.

According to the present invention in still another aspect, there is provided a process for the control of pests, specifically members of the Insecta and Arachnida, comprising the use of an organo-phosphorus compound of Formula I.

Examples of the invention will now be described in which all temperatures are in degrees Celsius.

*Example 1*

3-hydroxycoumarin (16.2 g.), anhydrous potassium carbonate (20.0 g.) and freshly prepared copper powder (0.5 g.) were stirred in dried methyl ethyl ketone (350 ml.) under reflux for one hour. 0,0-diethyl phosphochlidothioate (20.0 g.) was added over half-an-hour, and the reaction mixture refluxed for a further three hours.

The mixture was then filtered and the solvent removed by distillation. The residue was dissolved in benzene (100.0 ml.), washed twice with a solution (5%) of sodium carbonate (100 ml.), water (10 ml.) and dried over anhydrous sodium sulphate. The benzene was then removed to yield an oil which on addition to alcohol yielded crystals of O,O - diethyl-O-coumarin-3-yl-phosphorothioate having a melting point 61–63°.

*Example 2*

O,O - dimethyl - O - coumarin-3-yl-phosphorothioate was prepared in a manner similar to that described in Example 1, and had a melting point 93–94° C.

A miscible oil concentrate (weight/volume) of O,O-diethyl-O-coumarin-3-yl phosphorothioate was prepared by admixture of the following components:

| | |
|---|---|
| O,O-diethyl-O-coumarin-3-yl phosphorothioate | 19.25 |
| Emulsifier SE | 6.10 |
| Tergitol XD | 1.90 |
| Texofoe 90A20 | 3.00 |
| AR 395 | ml. to 100.0 |

Emulsifier SE is a 75% liquid anionic dispersing agent of alkyl aryl sulphonates.

*Example 4*

A wettable powder (weight/weight) of O,O-dimethyl-O-coumarin-3-yl phosphorothioate was prepared by admixture of the following components:

| | |
|---|---|
| O,O-dimethyl-O-coumarin-3-phosphorothioate | g-- 10.0 |
| Dispersol AC | g-- 2.0 |
| Hyflo Supercel | g-- 88.0 |

Dispersol AC is a solid anionic dispersing agent of disodium methylene dinaphthalene sulphonic acid.

*Example 5*

3-hydroxycoumarin (5 g.) and anhydrous potassium carbonate were stirred under reflux in anhydrous ethylmethyl ketone (75 ml.) for 2 hours. Diethylphosphochloridate (5.4 g.) was then added dropwise and the stirring under reflux continued for a further 2 hours. The mixture was then filtered hot and the solid washed with ethylmethyl ketone. The filtrate was evaporated to dryness and the residue dissolved in benzene and passed down a column of acid washed alumina. The yellow eluate was evaporated to dryness to give an orange oil which crystallised on standing. The crystals were recrystallised from di-isopropyl ether containing a trace of isopropyl alcohol, to give a colourless solid, M.P. 51–51°, identified as O,O-diethyl-O-coumarin-3-yl phosphate.

What we claim is:
1. An organo-phosphorus compound of the formula

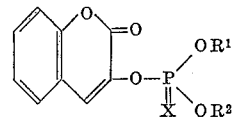

wherein
$R^1$ and $R^2$ are each alkyl having from 1 to 5 carbon atoms; and
X is selected from the class consisting of oxygen and sulphur.

2. O,O-dimethyl-O-coumarin-3-yl phosphorothioate.
3. O,O-diethyl-O-coumarin-3-yl phosphorothioate.
4. O,O-diethyl-O-coumarin-3-yl phosphate.
5. An unsubstituted organo-phosphorus compound as claimed in claim 1 wherein $R^1$ is a methyl group.
6. An unsubstituted organo-phosphorus compound as claimed in claim 1 wherein $R^1$ is an ethyl group.
7. An unsubstituted organo-phosphorus compound as claimed in claim 1 wherein $R^2$ is a methyl group.
8. An unsubstituted organo-phosphorus compound as claimed in claim 1 wherein $R^2$ is an ethyl group.

References Cited by the Examiner

UNITED STATES PATENTS

| | | | |
|---|---|---|---|
| 2,657,229 | 10/1953 | Orochena | 260—461 |
| 2,748,146 | 5/1956 | Schrader | 260—343.2 |
| 2,974,084 | 3/1961 | Mayhew et al. | 167—33 |
| 3,061,613 | 10/1962 | Newallis et al. | 260—343.2 |
| 3,086,907 | 4/1963 | Hessel | 167—33 |

FOREIGN PATENTS 510,817  5/1952  Belgium.

OTHER REFERENCES

Losco et al.: Gazz. Chim. Ital., volume 89 (1959), pages 1298–1303 and 1312.

WALTER A. MODANCE, *Primary Examiner.*

NICHOLAS S. RIZZO, *Examiner.*